UNITED STATES PATENT OFFICE.

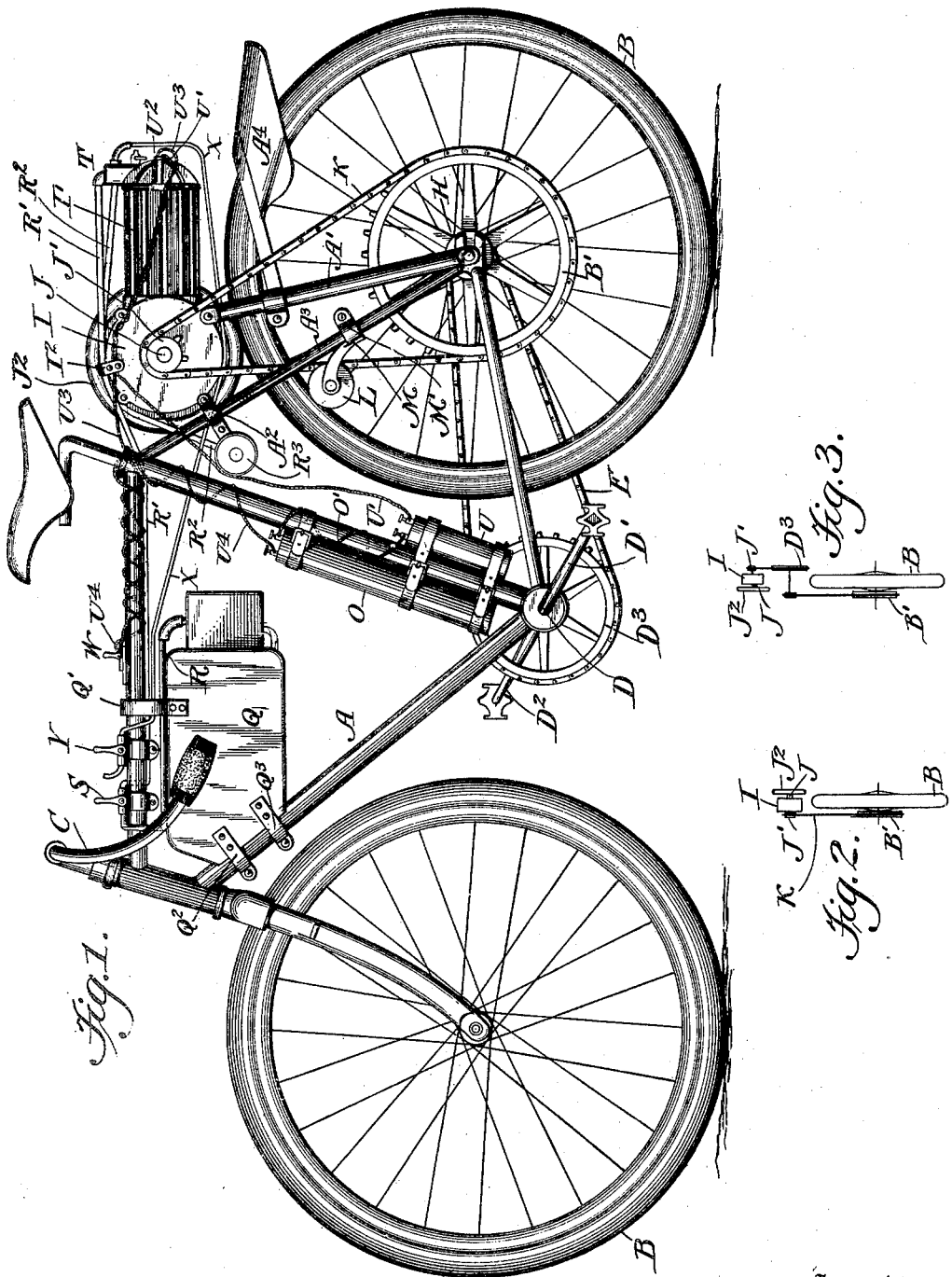

FRANK B. WIDMAYER, OF NEW YORK, N. Y.

MOTOR-BICYCLE.

SPECIFICATION forming part of Letters Patent No. 667,858, dated February 12, 1901.

Application filed June 28, 1900. Serial No. 21,890. (No model.)

*To all whom it may concern:*

Be it known that I, FRANK B. WIDMAYER, a citizen of the United States, residing in the borough of Manhattan, in the city and State of New York, have invented a certain new and useful Improvement in Motor-Bicycles, of which the following is a specification.

The improvement relates to that class in which the motive power is both the ordinary pedal-action operated by the rider and a gasolene-engine.

The invention involves such an arrangement of the motor and its attachments that it is not necessary to change the proportions or style of the ordinary bicycle materially. The motor, which is preferably a gasolene-engine of the four-cycle type of the style known as the "Otto" type or "Clement," is arranged with the reciprocating piston working horizontally a little below and in rear of the saddle, with the motor-shaft in front of the cylinder. The motor is connected to the rear wheel by a pitch-chain connecting a small sprocket-wheel on the motor-shaft with a large sprocket-wheel on the rear axle. The motor is supported at one point on each side near the forward end by connecting it firmly to the ordinary framing.

The accompanying drawings form a part of this specification and represent what I consider the best means of carrying out the invention.

Figure 1 is a side elevation showing the novel parts in their relations to an ordinary bicycle. Figs. 2 and 3 are on a smaller scale and show only the working parts. Fig. 2 is a rear elevation. Fig. 3 is a diagram showing the introduction of a counter-shaft.

Similar letters of reference indicate like parts in all the figures where they appear.

A is the ordinary bicycle-framing. B represents the ordinary wheels, C the handle-bar, and D the crank-shaft. $D'$ $D^2$ are the cranks carrying ordinary pedals, and $D^3$ the large sprocket-wheel communicating motion through the chain E between this shaft and the small sprocket H on the hub of the rear wheel. All these parts are of the ordinary and long-approved construction.

I is the cylindrical casing which incloses the crank-shaft J of the motor. This casing is supported on each side by a nearly upright brace $A'$, which connects to the main framing A at its lower end. The casing I is also supported on the framing on each side at the points farther forward by short firm brackets $A^2$, which brackets also extend in the opposite direction and support a muffler $R^3$. The motor-shaft is mounted in ball-bearings in this casing and carries a small sprocket-wheel $J'$, which connects by a pitch-chain K with a large sprocket-wheel $B'$ on the hub of the rear wheel of the bicycle.

L is a tightener-pulley supported in brackets M, one on each side, adjustable up and down on the parallel inclined rear framing $A^3$. These brackets are held firmly in the required position by screw-clamps $M'$. The tightener-wheel L, which is a loose sprocket running on ball-bearings, should press gently on the slack part of the chain K. The portions of the framing on which the brackets M are adjusted stand so inclined to the chain that raising or lowering adjusts the tighteners.

The motor-case I is of sufficient size to accommodate the crank and the connection therefrom to the piston of the motor. This piston plays in a horizontal cylinder $I'$, which extends rearward from the casing I and incloses a piston of the proper thickness as also the valves and provisions for introducing gasolene-vapor mixed with air, which may be of a long-approved style.

I have introduced a peculiarity in longitudinal ribs cast on the exterior of the cylinder $I'$ and which perform the important function of favorably presenting a great surface to disperse the heat produced by the explosions rapidly succeeding each other in the interior. I arrange these ribs longitudinally, so that when the bicycle is moving rapidly forward the inertia of the air will induce a current backward through the grooves between these ribs.

I carry a stock of gasolene in a reservoir Q, secured to the bicycle-framing by clips $Q'$ $Q^2$ $Q^3$. There are ordinary provisions (not shown) for introducing gasolene and for tightly closing the orifice.

R is a pipe which communicates with the interior of the tank Q and leads it up to a cock S, from whence it flows through a pipe $R'$ to the controlling-valve T of the engine. This valve and its connections, including the ordinary provisions for mixing air therewith and for introducing the mixture at the proper intervals into the interior of the cylinder I', may be of the style used in the Clement gasolene-engine. After each explosion the spent gases are forced out through a pipe $R^2$ and led forward and downward to the muffler $R^3$, constructed to provide liberty for their free escape and to avoid noise. The ignition is induced by electric sparking.

O is a casing inclosing a dry battery, and U a casing inclosing an induction-coil connected by a wire O'. These casings O and U are supported on the main central upright of the bicycle-frame.

U' is a wire leading the strong faradic current from the induction-coil or the battery-current through a support $I^2$ and thence to the ordinary sparking mechanism $U^2$ at the rear end of the cylinder. I can use the make-and-break spark or the jump-spark when using an induction-coil.

$U^3$ is a wire leading from the proper make-and-break connections (not shown) of the sparking mechanism, and being coiled around the upper horizontal member of the bicycle-framing leads to a switch W, which controls the connection to a return-wire $U^4$, which is coiled around the same portion of the framing, and thence downward on the upright back to the induction or spark coil.

$A^4$ is a mud-guard clipped on the uprights A' on each side and standing properly to defend the motor from any mud or other matter thrown upward and forward by the wheel.

It will be understood that the rider sits in the saddle and balances and guides the bicycle in the ordinary manner.

When the bicycle is traversing a steep descent, there is obviously no occasion for working the motor. There may often be long periods on good roads when the rider will find no inconvenience in supplying by pedal all the power required. In such cases the motor-piston will reciprocate idly. I provide for making the action of the motor neutral under such conditions by means of a simple air-passage and controlling-cock, the air-passage communicating with the cylinder I'.

X is the air-pipe, and Y a cock which controls it, the latter being fixed on the top bar or cross-bar of the bicycle, like the switch W and cock S, within easy reach of the operator. When this cock Y is open, the air is drawn in and let out again with each motion of the piston—an action analogous to breathing. When it is desired to cause the motor to serve as a brake, this cock Y is closed and the air in the cylinder is alternately compressed and expanded. It offers resistance to the motion when thus conditioned.

It will be seen that my parts I J and their connections, though designated for brevity as a "motor," really operate under three conditions—as a motor to impel, as a brake to retard, or as of no effect, (neutral.)

It will usually be found that in order to connect properly the motor is set to one side of the center line.

$J^2$ is a fly-wheel carried on the shaft J of the motor. By giving a proper length to this shaft and setting the fly-wheel $J^2$ on one end or the other the balance is maintained with the plane of the wheels erect.

I attach importance to the position and longitudinal ribs of the part I', because the first keeps these parts in the center line and does not derange the balancing and also is out of the way, so that they do not interfere with working, and the latter because it promotes the efficiency of cooling by convection, the air in its apparent motion rearward inducing a scouring effect through the longitudinal spaces between these ribs.

I attach importance to the pipe X and cock Y, because they give a capacity to work the motor either in its ordinary and most important capacity as a means for relieving the rider from labor and driving the bicycle as will be required a large portion of the time, or serving in the opposite manner as a brake to retard the motor in descending hills, or, again, as means for making the motor practically neutral. When the cock Y is open, the motor exerts no influence except by the almost inappreciable friction of the well-lubricated parts and of the air.

I attach importance to the provision for tightening the motor-chain K. It will be obvious that the means of tightening the ordinary chain E by shifting the axis of the rear wheel backward cannot be applied to this motor-chain. It is essential that the motor-axis be held at a uniform distance from the wheel which it is to drive. Ordinary tightening mechanism would be bulky and add to the weight. I make available the inclined position of the adjacent braces $A^3$ and simply relax the slight pinching-screw which holds the clamp M', and by shifting the clamp downward I tighten and by shifting it upward I relax the tightening-pulley L. Setting the screw again holds all fast with the chain adjusted.

The manipulations required of the rider are very simple. To make the motor available, the cock Y after being a short time open to commence is closed, the switch W is adjusted to give the sparks for igniting, and the cock S is opened. Thus conditioned the carbureted air will flow through the cock into the cylinder I' and be ignited at the proper periods. To stop the action of the motor, the cock S is closed and the switch W turned off to stop the sparking. This operation should be immediately followed by the opening of the air-cock Y, or this operation may be simultaneous with or even preceding the other.

Modifications may be made without departing from the principle or sacrificing the advantages of the invention.

Common bearings may be used for the motor-shaft instead of the ordinary ball-bearings. Other volatile liquids may be used in place of gasolene. Other forms of explosive-engine may be used.

Instead of connecting directly from the motor to the driving-wheel I can connect through an intermediate shaft with proper sprocket-chains, &c., as shown in Fig. 3.

Instead of retaining the rear uprights of the bicycle in their ordinary straight and uniformly-inclined conditions, one or both may be bent to accommodate a larger sprocket-wheel $D^3$. In cases where it is not easy to use a large sprocket-wheel a counter-shaft may be used. Fig. 3 shows such an arrangement for transmitting the rotations of the motor properly reduced in speed and increased in force.

The provisions for sparking to ignite may be, obviously, varied in form. Instead of a dry battery in the casing O, I can use other forms—eminently a dry primary cell or a storage-liquid cell.

Additions may be made. There may be the ordinary coasters for holding the feet idly clear of the pedals when desired. There may be a brake of any ordinary or suitable construction for retarding.

The invention is well adapted for use with a hub brake and coaster, by which I mean the devices in common use for holding the pedals still and letting the bicycle run freely forward and for braking by applying friction to the hub by reverse movement of the pedals; but when such are not employed the rider may keep his feet on the pedals and allow his limbs to flex alternately in the ordinary manner, either neutrally or exerting a force to increase or retard the motion. In difficult places, as a steep ascent or deep sand or mud, he will aid the motor with all his power. Ordinarily he may aid gently, obtaining the hygienic effect of moderate exercise without becoming fatigued, even if the ride is protracted. In making steep descents he may use his strength to back-pedal.

I can easily connect the switch W and the cock S together, so one hand will operate both simultaneously.

I claim as my invention—

1. In a motor-cycle the combination of mechanism $D'$ $D^2$ $D^3$ E H for operating by pedals and explosive-motor mechanism I I', and cocks S and Y and connections adapted to allow the motor to serve at will in different conditions all substantially as herein specified.

2. In a motor-cycle the combination of mechanism for operating by pedals and explosive-motor mechanism and cocks S and Y and connections and the switch W arranged in front of the rider and connections for controlling the ignition of the succeeding charges, all arranged to serve substantially as herein specified.

3. In a motor-cycle the combination of mechanism for operating by pedals and explosive-motor mechanism arranged over the driven hub connected by an independent pitch-chain and a tightener L carried in brackets M with means M' for adjusting the position up and down on the braces A' inclined relatively to the adjacent portion of the chain all arranged for joint operation so that such braces perform the double function of supports for the rider and means for carrying and allowing nice adjustment of the tightener, substantially as herein specified.

4. In a motor-cycle the combination with mechanism for operating by pedals, of an explosive-motor arranged horizontally over the rear wheel, and mechanically connected to aid in driving the latter, the engine having its shaft-casing I forward of the cylinder I' and supported by the framing $A'$, $A^2$, $A^3$, substantially as herein specified.

In testimony that I claim the invention above set forth I affix my signature in presence of two witnesses.

FRANK B. WIDMAYER.

Witnesses:
A. M. HUDSON,
W. F. WIDMAYER, Jr.